United States Patent [19]

Bruchmann et al.

[11] Patent Number: 5,786,402
[45] Date of Patent: Jul. 28, 1998

[54] PRODUCTION OF POLYURETHANE FOAMS IN THE PRESENCE OF AMINOALKYL- OR AMINOPHENYLIMIDAZOLES AS CATALYST, AND THE USE OF THESE CATALYSTS FOR THE PREPARATION OF POLYISOCYANATE POLYADDITION PRODUCTS

[75] Inventors: Bernd Bruchmann, Ludwigshafen; Ruth Zschiesche, Mannheim; Heinz-Dieter Lutter, Neckargemünd; Claudia Spang, Eisenberg; Werner Hinz, Frankenthal, all of Germany

[73] Assignee: BASF Aktiengesellschaft, Ludwigshafen, Germany

[21] Appl. No.: 415,290

[22] Filed: Apr. 3, 1995

[30] Foreign Application Priority Data

Apr. 13, 1994 [DE] Germany ............. 44 12 677.8

[51] Int. Cl.[6] ................................. C08G 18/20
[52] U.S. Cl. ............. 521/129; 521/159; 521/163; 521/172; 521/173; 521/174
[58] Field of Search ............... 521/129, 159, 521/163, 172, 174, 173

[56] References Cited

U.S. PATENT DOCUMENTS

| | | |
|---|---|---|
| 4,517,313 | 5/1985 | Nakatani . |
| 5,306,738 | 4/1994 | Yoshimura et al. ......... 521/129 |

FOREIGN PATENT DOCUMENTS

| | | |
|---|---|---|
| 451826-A2 | 10/1991 | European Pat. Off. . |
| 451826-A3 | 10/1991 | European Pat. Off. . |
| A-2085965 | 12/1971 | France . |
| A.4030515 | 4/1992 | Germany . |

*Primary Examiner*—James J. Seidleck
*Assistant Examiner*—John M. Cooney, Jr.
*Attorney, Agent, or Firm*—Fernando A. Borrego

[57] ABSTRACT

The invention relates to a process for the production of (flexible) polyurethane foams having reduced odor and reduced fogging values by reacting a) modified or unmodified organic polyisocyanates with b) relatively high-molecular-weight polyhydroxyl compounds and, if desired, c) low-molecular-weight chain extenders and/or crosslinking agents, in the presence of d) blowing agents, e) catalysts from the group consisting of aminoalkyl- and aminophenylimidazoles of the formula

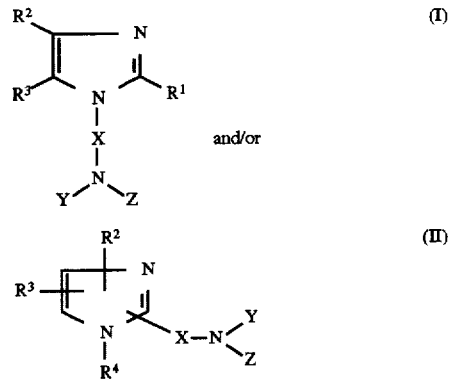

and, if desired, f) additives, and to the use of the aminoalkyl- and aminophenylimidazoles of the formula (I) and/or (II) as catalysts for the preparation of polyisocyanate polyaddition products.

12 Claims, No Drawings

PRODUCTION OF POLYURETHANE FOAMS IN THE PRESENCE OF AMINOALKYL- OR AMINOPHENYLIMIDAZOLES AS CATALYST, AND THE USE OF THESE CATALYSTS FOR THE PREPARATION OF POLYISOCYANATE POLYADDITION PRODUCTS

The present invention relates to a process for the production of polyurethane foams, preferably flexible polyurethane foams, having reduced fogging values by reacting organic and/or modified organic polyisocyanates (a) with relatively high-molecular-weight polyhydroxyl compounds (b) and, if desired, low-molecular-weight chain extenders and/or crosslinking agents (c) in the presence of blowing agents (d), aminoalkyl- or aminophenylimidazoles, in particular 1-(3-aminopropyl)imidazoles, either unsubstituted or additionally substituted on the imidazole ring, as catalysts (e) and, if desired, additives (f).

The present invention furthermore relates to the use of these aminoalkyl- or aminophenylimidazoles as catalyst for the preparation of polyisocyanate polyaddition products.

Processes for the production of polyurethane (PU) foams, for example flexible, semirigid or rigid PU foams, in open or closed molds or the corresponding structural PU foams by reacting organic and/or modified organic polyisocyanates with relatively high-molecular-weight compounds containing at least two reactive hydrogen atoms and, if desired, chain extenders and/or crosslinking agents in the presence of blowing agents, catalysts and, if desired, additives are known and are described in numerous patents and other publications. A comprehensive review on the production of PU foams is given, for example, in Kunststoff-Handbuch, Volume VII, Polyurethane, 1st Edition, 1966, edited by Dr. R. Vieweg and Dr. A. Höchtlen, and 2nd Edition, 1983, edited by Dr. G. Oertel (Carl Hanser Verlag, Munich).

In order to accelerate the reaction between the modified or unmodified organic polyisocyanates and the compounds containing reactive hydrogen atoms, preferably polyhydroxyl compounds, at least one catalyst is expediently added to the reaction mixture.

Examples of proven catalysts are tertiary amines, for example dimethylbenzylamine, dicyclohexylmethylamine, dimethylcyclohexylamine, N,N,N',N'-tetramethyldiaminodiethyl ether, N,N,N',N'-tetramethylbutanediamine, N,N,N',N",N"-pentamethyldiethylenetriamine, bis(dimethylaminopropyl)urea, 1-azabicyclo[2.2.0]-octane, 1,4-diazabicyclo[2.2.2]octane (triethylenediamine, DABCO®), di(4-dimethylaminocyclohexyl)methane, N,N',N"-tris(dialkylaminoalkyl)hexahydrotriazines, for example N,N',N"-tris(dimethylaminopropyl)-s-hexahydrotriazine, N-methyl- and N-ethylmorpholine, dimethylpiperazine, dimethylaminoethylpiperidine and substituted or unsubstituted imidazoles.

In DE-A-24 34 185 (U.S. Pat. No. 4,006,124), the catalysts used for the preparation of polyisocyanate polyaddition products are amidine-metal complexes, where the amidines can be N-alkylimidazoles, such as N-methyl- or N-butylimidazole. N-Alkyl-2-methylimidazoles are mentioned in DE-A-41 16 562 as suitable curing catalysts for urethane prepolymers having an isocyanate content of from 8 to 20% by weight. According to U.S. Pat. No. 4,431,753, 1,2-dimethylimidazole is a constituent of a catalyst combination for the production of PU elastomers and PU foams. 1,2,4,5-Tetraalkylimidazoles are strong bases and, according to DE-A-21 61 770, effective catalysts for the preparation of polyurethanes. For the production of flexible PU foams by reacting isocyanate prepolymers and compositions which react with isocyanate groups and contain at least 50% by weight of water, EP-A-0 566 247 mentions 1,2-dialkylimidazoles having from 1 to 4 carbon atoms in the alkyl radical as suitable catalysts. N-Substituted imidazoles, for example N-alkyl-, N-benzyl-, N-vinyl- and N-dimethylaminopropylimidazoles, are mentioned in EP-A-0 451 826 as catalysts for the production of flexible PU foams.

These tertiary amines and imidazoles are distinguished by good catalytic activity. However, it is disadvantageous that they are frequently relatively volatile, have intense odors and often migrate out of the polyaddition product. The films and coatings formed on automobile windscreens due to fogging have been found analytically to contain, in particular, tertiary amines as a constituent. As a consequence of these analytical findings, very strict limits have been prescribed for the automobile industry for fogging from polyurethane moldings. The fogging values must be lower than the maximum limit of 1 mg of condensate, measured in accordance with DIN 75 201, Method B. This cumulative value arises from the individual values for the volatile constituents in the polyisocyanates and the NCO-reactive compounds, stabilizers, for example silicones and catalyst systems.

Migration of the catalyst out of the PU molding and the odor of the catalyst have been reduced using catalysts which contain NCO-reactive radicals, react with isocyanate groups and can be incorporated into the polyurethane matrix, for example N-unsubstituted imidazoles, for example 1-H-imidazole or 2-methylimidazole. These imidazoles react with isocyanate groups to form ureas, but are thermally labile and can be re-cleaved into the starting components. The imidazole re-formed as a consequence is then again capable of migration. This reaction forms the basis for the preparation of imidazoleureas, which, according to U.S. Pat. No. 4,041,019, are used as heat-activatable PU catalysts or as masked isocyanates.

Also known is the use of hydroxyl-containing imidazoles for reducing the odor of PU foams. N-Hydroxyalkyl-substituted imidazoles are mentioned as PU catalysts in, for example, U.S. Pat. No. 3,448,065. EP-A-0 451 826 mentions, inter alia, N-hydroxyalkylimidazole having 1 to 3 carbon atoms in the alkyl radical as PU catalyst for the production of flexible PU foams. These catalysts have the disadvantage, inter alia, that, as monofunctional compounds, they are potential chain terminators for the polyisocyanate polyaddition reaction and form urethanes; urethanes of this structure act as catalysts under the preparation conditions in the reaction mixture, in particular at elevated temperatures, can be re-cleaved into the starting components and are therefore capable of migrating out of the polyurethane.

It is an object of the present invention to produce polyurethane foams in the presence of catalysts or catalyst systems which are nonvolatile or have only low volatility, but exhibit no reduction in their catalytic activity.

We have found that, surprisingly, this object has been achieved by using aminoalkyl- or aminophenylimidazoles as PU catalyst.

The present invention therefore provides a process for the production of PU foams by reacting
a) organic polyisocyanates, modified organic polyisocyanates or mixtures of organic and modified organic polyisocyanates with
b) relatively high-molecular-weight polyhydroxyl compounds containing at least two reactive hydrogen atoms and

3 c) if desired low-molecular-weight chain extenders, crosslinking agents or mixtures of chain extenders and crosslinking agents, in the presence of d) blowing agents, e) catalysts and f) if desired additives, wherein the catalysts (e) used are aminoalkyl- or aminophenylimidazoles of the formula

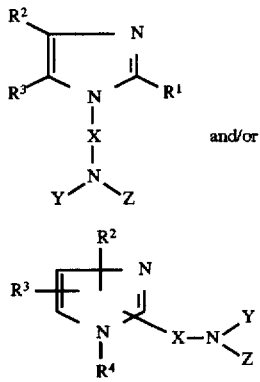

where $R^1, R^2, R^3$ are identical or different radicals from the group consisting of linear and branched alkyl having 1 to 10 carbon atoms, preferably 1 to 4 carbon atoms, in particular 1 or 2 carbon atoms, alkoxy having 1 to 4 carbon atoms, preferably 1 or 2 carbon atoms, N-mono- and N,N-dialkylamino having 1 to 4 carbon atoms, preferably 1 or 2 carbon atoms, in the alkyl moiety, N-mono- and N,N-dialkylaminoalkylene having 1 to 4 carbon atoms, preferably 1 or 2 carbon atoms, in the alkyl moiety and 2 to 4 carbon atoms, preferably 2 or 3 carbon atoms, in the alkylene moiety, phenyl, halogen or hydrogen, $R^4$ is as defined for $R^1$, with the exception of halogen and alkoxy, X is alkylene having 2 to 6 carbon atoms, preferably 3 or 4 carbon atoms, or phenylene, Y is hydrogen, hydroxyalkyl having 2 to 4 carbon atoms, preferably 2 or 3 carbon atoms, or hydroxypolyoxyalkylene having 2 to 20 alkylene oxide units, preferably 2 to 10 alkylene oxide units, and Z is hydrogen, alkylene having 1 to 4 carbon atoms, preferably 1 or 2 carbon atoms, phenyl, hydroxyalkyl having 2 to 4 carbon atoms, preferably 2 or 3 carbon atoms, or hydroxypolyoxyalkylene having 2 to 20 alkylene oxide units, preferably 2 to 10 alkylene oxide units.

The present invention furthermore provides the use of aminoalkyl- or aminophenylimidazoles of the formula

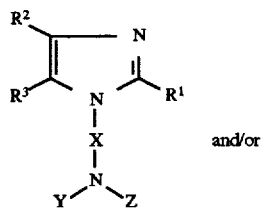

4

-continued

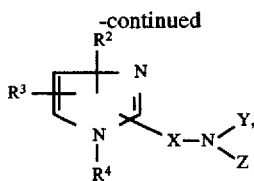

where $R^1, R^2, R^3, R^4$, X, Y and Z are as defined above, as catalysts for the preparation of polyisocyanate polyaddition products.

The use of the novel aminoalkyl- or aminophenylimidazoles allows the above disadvantages to be overcome or at least reduced.

The reaction of the aminoalkyl or aminophenyl groups with polyisocyanates results in the formation of stable urea groups which are not re-cleaved into the starting components under the reaction conditions which occur during foam formation. The urea groups formed can be converted in subsequent reactions into addition products containing biuret groups, which themselves contain two free bonded isocyanate groups. The formation of difunctional addition products does not affect the polyaddition reaction, and the catalytic activity of the imidazole radical remains unchanged.

The N,N-di(hydroxyalkyl)aminoalkyl-, N,N-di(hydroxypolyoxyalkylene)aminoalkyl- or -phenylimidazoles which can be used according to the invention have two catalytically active centers, namely the tertiary amino group and the imidazole radical. Even if these urethane bonds formed with polyisocyanates re-cleave, the molecular weight of the PU catalysts which can be used according to the invention is so high that the dihydroxyl compounds do not diffuse out of the polyurethane to any significant extent and therefore do not contribute toward fogging.

The polyisocyanate polyaddition products, preferably the PU foams, in particular the flexible PU foams, are produced by the novel process using, with the exception of the catalysts (e), the conventional formative components (a) to (c), blowing agents (d) and, if desired, additives (f), to which the following details apply:

Suitable organic polyisocyanates (a) are aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, eg. 4,4'-diisocyanato-1,2-diphenylethane, 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, ie. products which are obtained by chemical reaction of organic diisocyanates and/or polyisocyanates. Specific examples are ester, urea, biuret, allophanate, carbodiimide, isocyanurate, uretdione, and/or urethane group-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 8500, specific examples of di- and polyoxyalkylene glycols, which can be employed individually or as mixtures, being diethylene glycol, dipropylene glycol, polyoxyethylene glycol, polyoxypropylene glycol and polyoxypropylene-polyoxyethylene glycol. NCO-containing prepolymers containing from 30 to 9% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, eg. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, eg. 2,4'- or 4,4'-diphenylmethane diisocyanate, crude MDI or 2,4- and/or 2,6-tolylene diisocyanate.

Organic polyisocyanates which have proven particularly successful and are therefore preferred for use in the production of the PU foams, preferably flexible PU foams, are: NCO-containing prepolymers having an NCO content of from 30 to 9% by weight, in partiuclar based on polyether- or polyester-polyols and one or more diphenylmethane diisocyanate isomers, advantageously 4,4'-diphenylmethane diisocyanate and/or modified, urethane group-containing organic polyisocyanates having an NCO content of from 33.6 to 15% by weight, in particular based on 4,4'-diphenylmethane diisocyanate or diphenylmethane diisocyanate isomer mixtures, mixtures of 2,4- and 2,6-tolylene diisocyanates, mixtures of tolylene diisocyanates and crude MDI or in particular mixtures of the abovementioned prepolymers based on diphenylmethane diisocyanate isomers and crude MDI. For the production of the flexible PU foams, the aromatic polyisocyanates, modified aromatic polyisocyanates or polyisocyanate mixtures expediently have a mean functionality of from 2 to 2.6, preferably from 2 to 2.4.

The relatively high-molecular-weight polyhydroxyl compounds b) containing at least two reactive hydrogen atoms are expediently those having a functionality of from 2 to 4, preferably 2 to 3, in particular 2.0 to 2.6, and a molecular weight of from 500 to 8500, preferably from 1500 to 6500, in particular from 1800 to 5000 (the molecular weights were calculated with the aid of the experimentally determined hydroxyl number). Particular success has been achieved using hydroxyl compounds selected from the group consisting of the polyether-polyols, polyester-polyols, polythioether-polyols, hydroxyl-containing polyester- amides, hydroxyl-containing polyacetals, hydroxyl-containing aliphatic polycarbonates and polymer-modified polyether-polyols, or mixtures of at least two of said polyols. Particular preference is given to polyester-polyols and/or especially polyether-polyols.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids ay be used either individually or mixed with one another. The free dicarboxylic acids may also be replaced by the corresponding dicarboxylic acid derivatives, for example dicarboxylic acid mono- and/or diesters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols and alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol, glycerol or mixtures of at least two of said diols, in particular mixtures of 1,4-butanediol, 1,5-pentanediol and 1,6-hexanediol. Furthermore, polyester-polyols made from lactones, eg. ε-caprolactone or hydroxycarboxylic acids, e.g. ω-hydroxycaproic acid, may also be employed.

The polyester-polyols may be prepared by polycondensing the organic, eg. aromatic and preferably aliphatic polycarboxylic acids and/or derivatives thereof and polyhydric alcohols without using a catalyst or preferably in the presence of esterification catalysts, expediently in an inert gas atmosphere, eg. nitrogen, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, eg. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 3, in particular from 2 to 2.6, and a molecular weight of from 500 to 3600, preferably from 1500 to 3000, in particular from 1800 to 2500, and can, if advantageous for the formation of low-fogging polyisocyanate polyaddition products, be subjected to further purification, for example by distillation under reduced pressure in a thin-film evaporator or falling-film evaporator.

Howver, the polyhydroxyl compounds used are in particular polyether-polyols prepared by conventional processes, for example by anionic polymerization using alkali metal hydroxides such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 4, preferably 2 or 3, reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, eg. ethanolamine, N-methyl- and N-ethyl-ethanolamine, dialkanolamines, eg. diethanolamine, N-methyl- and N-ethyldiethanolamine, and trialkanolamines, eg. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane and pentaerythritol.

The polyether-polyols, preferably polyoxypropylene- and polyoxypropylene-polyoxyethylene-polyols, have a functionality of from 2 to 3, in particular from 2.0 to 2.6, and molecular weights of from 500 to 8500, preferably from 2200 to 6500, and suitable polyoxytetramethylene glycols have a molecular weight of up to approximately 4500, preferably from 650 to 2200.

Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tertiary amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the polymer-modified polyether-polyols or polyester-polyols and the hydroxyl-containing polyester-amides, polyacetals and/or polycarbonates.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, trioxyethylene glycol or tetraoxyethylene glycol, with dialkyl carbonates, eg. diethyl carbonate, diaryl carbonates, eg. diphenyl carbonate, or phosgene.

The hydroxyl-containing polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

The polyisocyanate polyaddition products, preferably PU foams, in particular flexible PU foams, can be produced with or without the use of chain extenders and/or crosslinking agents (c). However, it may prove advantageous, in order to modify the mechanical properties, for example the hardness, to add chain extenders, crosslinking agents or, if desired, mixtures thereof. The chain extenders and/or crosslinking agents used are relatively low-molecular-weight polyhydric alcohols, preferably diols and/or triols, having a molecular weight of less than 480, preferably from 60 to 300. Examples of suitable chain extenders are aliphatic, cycloaliphatic and/or araliphatic diols having from 2 to 14 carbon atoms, preferably from 4 to 10 carbon atoms, eg. ethylene glycol, 1,3-propanediol, 1,10-decanediol, o-, m- and p-dihydroxycyclohexane, diethylene glycol, dipropylene glycol, and preferably 1,3-butanediol, 1,4-butanediol, 1,6-hexanediol, and bis(2-hydroxyethyl)hydroquinone, and examples of suitable crosslinking agents are triols, such as 1,2,4- and 1,3,5-trihydroxycyclohexane, trimethylolethane, glycerol and trimethylolpropane, and hydroxyl-containing polyalkylene oxides, eg. having a molecular weight of up to 480, based on ethylene oxide and/or 1,2-propylene oxide, and the abovementioned diols and triols as initiator molecules.

The chain extenders used are in particular ethylene glycol, 1,3-butanediol, 1,4-butanediol, 1,6-hexanediol and mixtures of at least two of said diols.

If compounds of component (c) are used, they can be employed in the form of mixtures or individually and are advantageously used in amounts of from 1 to 40 parts by weight, preferably from 5 to 20 parts by weight, based on 100 parts by weight of the relatively high-molecular-weight polyhydroxyl compounds (b).

The relatively high-molecular-weight polyhydroxyl compounds (b) containing at least two reactive hydrogen atoms or mixtures of (b) and low-molecular-weight chain extenders and/or crosslinking agents (c) for the production of the PU foams advantageously have a hydroxyl number of less than 300 mg of KOH/g, preferably less than 280 mg of KOH/g, in particular from 28 to 200 mg of KOH/g.

The blowing agent (d) used is preferably water, which reacts with the organic, modified or unmodified polyisocyanates (a) to form carbon dioxide and urea groups and thereby affects the compressive strength of the end products. In order to achieve the desired density, the water is usually used in amounts of from 0.05 to 6% by weight, preferably from 0.1 to 5% by weight, based on the weight of formative component (a) to (c).

The blowing agent (d) used may, instead of water, or preferably in combination with water, also be a low-boiling liquid which evaporates under the influence of the exothermic polyaddition reaction and advantageously has a boiling point at atmospheric pressure in the range from −40° to 90° C., preferably from 10° to 50° C., or a gas.

The liquids of the abovementioned type and the gases which are suitable as blowing agents can be selected, for example, from the group consisting of the alkanes, eg. propane, n- and isobutane, n- and isopentane and preferably technical-grade pentane mixtures, cycloalkanes, eg. cyclobutane, cyclopentene, cyclohexene and preferably cyclopentane and/or cyclohexane, dialkyl ethers, eg. dimethyl ether, methyl ethyl ether or diethyl ether, cycloalkylene ethers, eg. furan, ketones, eg. acetone and methyl ethyl ketone, carboxylates, such as ethyl acetate and methyl formate, carboxylic acids, such as formic acid, acetic acid and propionic acid, fluoroalkanes, which are degraded in the troposphere and are therefore benign to the ozone layer, eg. trifluoromethane, difluoromethane, difluoroethane, tetrafluoroethane and heptafluoroethane, and gases, eg. nitrogen, carbon monoxide and noble gases, eg. helium, neon and krypton.

The most expedient amount of low-boiling liquid and gases, which may in each case be employed individually as liquid or gas mixtures or as gas/liquid mixtures, depends on the density desired and on the amount of water employed. The amounts necessary can easily be determined by simple preliminary experiments. Satisfactory results are usually given by amounts of from 0.5 to 20 parts by weight, preferably from 2 to 10 parts by weight, of liquid and from 0.01 to 30 parts by weight, preferably from 2 to 20 parts by weight, of gas, in each case based on 100 parts by weight of component (b) and, if used, (c).

The blowing agents (d) are preferably water, alkanes having 3 to 7 carbon atoms, cycloalkanes having 4 to 7 carbon atoms or mixtures of at least two of the compounds mentioned as preferred blowing agents.

As stated above, the blowing agents used are not chloroperfluorocarbons.

As stated above, the catalysts (e) used for the preparation of polyisocyanate polyaddition products and preferably for the production of PU foams, in particular flexible PU foams, by the novel process are aminoalkyl- or aminophenylimidazoles of the formula (I) and/or (II)

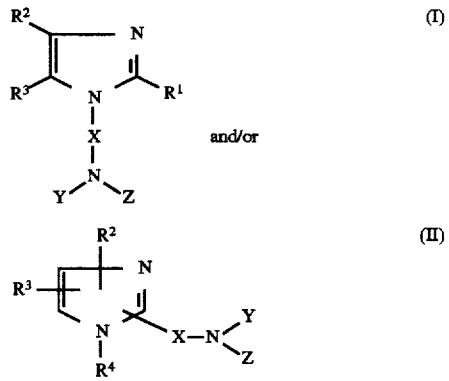

where $R^1$, $R^2$, $R^3$, $R^4$, X, Y and Z are as defined above. If $R^1$, $R^2$, $R^3$, $R^4$, Y and Z comprise alkyl groups having 1 to 10 or 1 to 4 carbon atoms, mention may be made here by way of example of n- and isopropyl, n- and sec-butyl, amyl, hexyl, 2,2-dimethylhexyl, 2,2,4-trimethylhexyl, heptyl, octyl, 2-ethyloctyl, decyl- and preferably methyl and ethyl, examples of suitable alkoxy radicals are n- and isopropoxy, n-butoxy and preferably methoxy and ethoxy, suitable alkylene radicals are ethylene, 2-propylene and preferably n-propylene and n-butylene. Examples which may be mentioned of hydroxyalkyl having 2 to 4 carbon atoms are 4-hydroxybutyl, 2-hydroxybutyl, 3-hydroxybutyl and preferably 2-hydroxyethyl and 2-hydroxypropyl, and examples which may be mentioned of hydroxypolyoxyalkylene are hydroxyl-containing polyoxyethylene, polyoxypropylene, polyoxybutylene, polyoxyethylene-polyoxypropylene, polyoxybutylene-polyoxypropylene and polyoxybutylene-polyoxyethylene. Examples which may be mentioned of alkylene X are ethylene, propylene, butylene, pentamethylene and hexamethylene, preference being given to alkylene having 3 or more carbon atoms, in particular propylene or butylene.

Examples of novel catalysts are 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole and 1-aminobutyl-2,5-dimethylimidazole.

Preference is given to 1-(3-aminopropylimidazoles, either unsubstituted or substituted on the imidazole ring, for example 1-(3-aminopropyl)-2-methylimidazole, 1-(3-aminopropyl)-2-ethyl-4-methylimidazole, the N,N-ethoxylation product prepared from 1 mol of 1-(3-aminopropyl)-2-methylimidazole and 2 to 20 mol, in particular 10 mol, of ethylene oxide, and in particular 1-(3-aminopropyl) imidazole.

According to the invention, the PU catalysts are preferably exclusively aminophenyl- or in particular aminoalkylimidazoles of the formula (I) or (II). However, the aminoalkyl- and/or aminophenylimidazoles which can be used according to the invention can also be employed in combination with other polyurethane catalysts. Suitable combinations can comprise, for example, aminoalkyl- or aminophenylimidazoles and organometallic compounds, preferably organotin compounds, such as tin(II) salts of organic carboxylic acids, eg. tin(II) diacetate, tin(II) dioctanoate, tin(II) diethylhexanoate and tin(II) dilaurate, and dialkyltin(IV) salts of organic carboxylic acids, eg. dibutyltin diacetate, dibutyltin dilaurate, dibutyltin maleate and dioctyltin diacetate.

In another embodiment, the aminoalkyl- or aminophenylimidazoles which can be used according to the invention can be used as catalysts in the form of a mixture with highly basic amines. Examples of highly basic amines which may be mentioned are amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, pentamethyldiethylenetriamine, tetramethyldiaminoethyl ether, bis(dimethylaminopropyl) urea, dimethylpiperazine, 1,2-dimethylimidazole, 1-azabicyclo[3.3.0] octane, and, preferably, 1,4-diazabicyclo [2.2.2]octane and alkanolamine compounds such as triethanolamine, triisopropanolamine, N-methyl- and N-ethyldiethanolamine and dimethylethanolamine.

The novel aminophenylimidazoles, preferably aminoalkylimidazoles, or mixtures of aminophenyl- and aminoalkylimidazoles, can be used, for example, in amounts of from 0.1 to 10% by weight, preferably from 0.5 to 5% by weight, in particular from 0.6 to 2% by weight, based on the weight of the polyhydroxyl compounds (b). If the aminophenyl- and/or aminoalkylimidazoles are combined with other PU catalysts, in particular the abovementioned organometallic compounds and/or highly basic amines, the amounts of the catalyst combination are usually likewise within the abovementioned range.

For the production of PU foams, preferably flexible PU foams, by the novel process, additives (f) can be used, if desired. Examples of such additives which may be mentioned are surfactants, foam stabilizers, cell regulators, lubricants, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, eg. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

A particularly successful lubricant is a ricinoleic acid polyester having a molecular weight of from 1500 to 3500, preferably from 2000 to 3000, which is expediently employed in an amount of from 0.5 to 10% by weight, preferably from 5 to 8% by weight, based on the weight of component (b) or of components (b) and (c).

For the purposes of the present invention, fillers, in particular reinforcing fillers, are conventional organic and inorganic fillers, reinforcing agents and weighting agents. Specific examples are inorganic fillers, such as silicate minerals, for example phyllosilicates, such as antigorite, serpentine, hornblends, amphiboles, chrysotile, talc; metal oxides, such as kaolin, aluminum oxides, aluminum silicate, titanium oxides and iron oxides, metal salts, such as chalk, barytes and inorganic pigments, such as cadmium sulfide, zinc sulfide and glass particles. Examples of suitable organic fillers are carbon black, melamine, colophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate.

In addition to the abovementioned halogen-substituted phosphates, it is also possible to use inorganic flameproofing agents, such as red phosphorus, expandable graphite, aluminum oxide hydrate, antimony trioxide, arsenic oxide, ammonium polyphosphate, ammonium sulfate and calcium sulfate, or cyanuric acid derivatives, eg. melamine and dicyandiamide, or mixtures of two or more flame-proofing agents, eg. expandable graphite and ammonium polyphosphate, ammonium polyphosphates and melamine and also, if desired, expandable graphite or starch, in order to flameproof the flexible PU foams. In general, it has proven expedient to use from 2 to 50 parts by weight, preferably from 5 to 25 parts by weight, of said flameproofing agents or mixtures per 100 parts by weight of components (a) to (c).

Further details on the other additives mentioned above can be obtained from the specialist literature, for example from the monograph by J. H. Saunders and K. C. Frisch in High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st and 2nd Editions, 1966 and 1983.

To produce the PU foams, the organic modified or unmodified polyisocyanates (a), the relatively high-molecular-weight polyhydroxyl compounds (b) containing at least two reactive hydrogen atoms and, if used, the low-molecular-weight chain extenders and/or crosslinking agents (c) are reacted in such amounts that the equivalence ratio between the NCO groups of the polyisocyanates (a) and the total number of reactive hydrogen atoms of the compounds (b) and, if used, (c) is from 0.70 to 1.50:1, preferably from 0.85 to 1.15:1, in particular from 0.9 to 1.1:1.

The PU foams can be produced by the prepolymer method or preferably the one-shot method at low or high pressure in an open or closed, expediently heatable mold, for example a metallic mold, eg. made of aluminum, cast iron or steel, or a mold made from a fiber-reinforced polyester or epoxy molding material.

It has proven particularly advantageous to use the two-component method and to combine components (b), (d), (e) and, if used, (c), and (f) in component (A) and to use the organic polyisocyanate, the modified polyisocyanate (a) or the mixture of said polyisocyanates and, if desired, the blowing agent (d) as component (B).

The starting components are usually mixed at from 15° to 80° C., preferably at from 25° to 55° C., and can be introduced into an open mold at atmospheric pressure or into a closed mold at superatmospheric pressure. The mixing can be carried out mechanically by means of a stirrer or a stirring screw or under high pressure by the countercurrent injection method. The mold temperature is expediently from 20° to 120° C., preferably from 30° to 80° C., in particular from 45° to 60° C. If, for example, PU foam moldings are produced with compaction, the degrees of compaction are usually in the range from 1.1 to 8.3, preferably from 2 to 7, in particular from 2.4 to 4.5.

The amount of reaction mixture introduced into the mold is advantageously such that the moldings obtained have an overall density of from 0.03 to 0.9 g/cm$^3$, preferably from 0.03 to 0.7 g/cm$^3$. The PU foams can also be produced by the slabstock foam method. Slabstock foams usually have densities of from 0.02 to 0.06 g/cm$^3$.

The slabstock foams and (flexible) PU foam moldings produced by the novel process are used, for example, in the automotive industry, for example as armrests, headrests and safety panels in the passenger cabin, and as bicycle and motorcycle saddles, shoe soles and ski boot inners. They are furthermore suitable as cushioning materials in the furniture industry and automobile industry.

EXAMPLES

Production of Flexible PU Foams

Examples 1 to 4 and Comparative Examples I and II

Component A: a mixture comprising 97.5 parts by weight of a glycerol-initiated polyoxypropylene-(86% by weight)-polyoxyethylene (14% by weight)-polyol having a molecular weight of 6000, 2.0 parts by weight of water and p parts by weight of a catalyst.

Component B: a mixture comprising 40 parts by weight of a quasi-prepolymer having an NCO content of 23% by weight, prepared by reacting a mixture of 2,4'- and 4,4'-diphenylmethane diisocyanate and a glycerol-initiated polyoxypropylene(90% by weight)-polyoxyethylene(10% by weight)-polyol having a molecular weight of 3000, and 60 parts by weight of a mixture containing, based on the total weight, 43.3% by weight of diphenylmethane diisocyanate isomers and 56.7% by weight of more highly condensed polyphenyl-polymethylene polyisocyanates.

In order to produce the flexible PU foams, 100 parts by weight of component A and 40.9 parts by weight of component B, corresponding to an isocyanate index of 100, were mixed vigorously at 23° C., and the resultant reaction mixture was transferred into an open polyethylene pail, where it was left to expand freely and cure.

The catalysts present in component A, the amounts used and the fogging values measured on the flexible PU foams in accordance with DIN 75 201, Method B, are shown in Table 1 below.

TABLE 1

Summary of the catalysts and amounts p used in Examples 1 to 4 and Comparative Examples I and II, and the fogging values measured on the flexible PU foams produced

| | | Catalyst | | |
|---|---|---|---|---|
| Example | Comp.-Ex. | Type | Amount p [parts by weight] | Fogging value [mg] |
| 1 | — | 1-(3-Aminopropyl)-imidazole) | 0.56 | 0.03 |
| 2 | — | 1-(3-Aminopropyl)-2-methylimidazole | 0.62 | 0.13 |
| 3 | — | 1-(3-Aminopropyl)-2-ethyl-4-methyl-imidazole | 0.75 | 0.12 |
| 4 | — | 1-(3-Aminopropyl)-2-methylimidazole containing 10 ethylene oxide units | 0.75 | 0.17 |
| — | I | 1,4-Diazabicyclo-[2.2.2]octane | 0.50 | 0.27 |
| — | II | 1-(2-Hydroxypropyl)-2-methylimidazole | 0.60 | 0.16 |

Examples 5 to 7 and Comparative Examples III and IV

Component A: a mixture comprising 65.63 parts by weight of a glycerol-initiated polyoxypropylene (86% by weight)-polyoxyethylene(14% by weight)-polyol having a molecular weight of 6000, 27.40 parts by weight of a polyoxypropylene (94% by weight)-polyoxyethylene(6% by weight)-polyol initiated by means of aqueous glycerol, having a functionality of 2.1 and a molecular weight of 3900, 2.00 parts by weight of a glycerol-initiated polyoxypropylene(25% by weight)-polyoxyethylene (75% by weight)-polyol having a molecular weight of 4000, 0.50 part by weight of diethanolamine, 0.12 part by weight of a 70% strength by weight solution of bis(dimethylaminoethyl) ether in dipropylene glycol, 0.70 part by weight of dimethylaminopropylamine and p parts by weight of an imidazole catalyst Component B: as described under Examples 1 to 4.

In order to produce flexible PU foams, 100 parts by weight of component A and 58 parts by weight of component B, corresponding to an isocyanate index of 80, were mixed vigorously at 23° C., and the resultant reaction mixture was transferred into a polyethylene pail, where it was left to expand freely and cure.

For measurement of the fogging values in accordance with DIN 75 201, Method B, moldings having the same shape and density were used in all the examples and comparative examples. The density of the flexible PU foams and thus the molding weight are not taken into account in DIN 75 201. The fogging values shown in Table 2 below therefore relate to flexible PU foams having comparable densities in order to ensure comparability. Table 2 also shows the catalysts used and their amounts p.

TABLE 2

Summary of the catalysts and amounts p used in Examples 5 to 7 and Comparative Examples III and IV, and the densities and fogging values measured on the flexible PU foams produced

| | | Catalyst | | | |
|---|---|---|---|---|---|
| Ex. | Comp.-Ex. | Type | Amount p [parts by weight] | Density [g/l] | Fogging value [mg] |
| 5 | — | 1-(3-Aminopropyl)-imidazole | 0.9 | 50.5 | 0.30 |
| 6 | — | 1-(3-Aminopropyl)-2-methylimidazole | 0.9 | 50.0 | 0.33 |
| 7 | — | 1-(3-Aminopropyl)-2-ethyl-4-methyl imidazole | 0.9 | 49.6 | 0.34 |
| — | III | 1-Methylimidazole | 0.3 | 48.9 | 0.51 |
| — | IV | 1,2-Dimethylimidazole | 0.2 | 48.0 | 0.43 |

The higher fogging values of flexible PU foams produced in Examples 5 to 7 (Table 2) compared with Examples 1 to 3 (Table 1) show that the conventional tertiary amine catalysts bis(dimethylaminoethyl) ether and dimethylaminopropylamine contribute to an undesired increase in the fogging values.

A comparison of Comparative Examples III and IV with Examples 5 to 7 shows that the replacement of the conventional imidazole catalysts in conventional catalyst combinations by the novel aminoalkylimidazoles results in a significant reduction in the fogging values.

We claim:

1. A process for the production of polyurethane foams comprising reacting a) organic polyisocyanates, modified organic polyisocyanates or mixtures of organic and modified organic polyisocyanates with b) polyhydroxyl compounds containing at least two reactive hydrogen atoms and c) optionally chain extenders, crosslinking agents or mixtures of chain extenders and crosslinking agents, in the presence of d) blowing agents, and e) catalysts, wherein the catalysts (e) comprise aminoalkyl- or aminophenylimidazoles of the formula

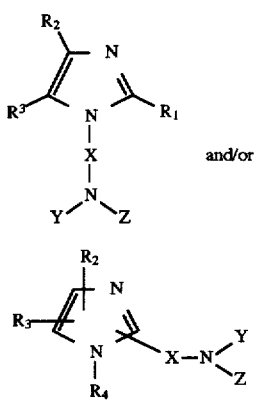

(I)

and/or (II)

where

R[1], R[2], R[3] are identical or different radicals from the group consisting of linear or branched alkyl having 1 to 10 carbon atoms, alkoxy having 1 to 4 carbon atoms, N-mono- and N,N-dialkylamino having 1 to 4 carbon atoms in the alkyl moiety, N-mono- and N,N-dialkylaminoalkylene having 1 to 4 carbon atoms in the alkyl moiety and 2 to 4 carbon atoms in the alkylene moiety, phenyl, halogen and hydrogen, R[4] is as defined for R[1], with the exception of halogen and alkoxy, X is alkylene having 2 to 6 carbon atoms or phenylene, Y is hydrogen, hydroxyalkyl having 2 to 4 carbon atoms or hydroxypolyoxyalkylene having 2 to 20 alkylene oxide units and Z is hydrogen, alkylene having 1 to 4 carbon atoms, phenyl, hydroxyalkyl having 2 to 4 carbon atoms or hydroxypolyoxyalkylene having 2 to 20 alkylene oxide units.

2. A process as claimed in claim 1, wherein the catalysts (e) comprise 1-(3-aminopropyl)imidazole, 1-(3-aminopropyl)-2-methylimidazole of 1-(3-aminopropyl)-2-ethyl-4-methylimidazole.

3. A process as claimed in claim 1, wherein the organic and/or modified organic polyisocyanates (a) comprise NCO-containing prepolymers having an NCO content of from 30 to 9% by weight, based on polyether- or polyester-polyols and one or more diphenylmethane diisocyanate isomers, modified organic polyisocyanates containing urethane groups and having an NCO content of from 33.6 to 15% by weight based on 4,4'-diphenylmethane diisocyanate or diphenylmethane diisocyanate isomer mixtures, mixtures of 2,4- and 2,6-tolylene diisocyanates, mixtures of tolylene diisocyanates and crude MDI or mixtures of the above prepolymers based on diphenylmethane diisocyanate isomers and crude MDI.

4. A process as claimed in claim 1, wherein the polyhydroxyl compounds comprise polyether-polyols or polyester-polyols having a functionality in the range of 2.0 to 4.0 and a molecular weight of 500 to 8,500.

5. A process as claimed in claim 1, wherein the blowing agents (d) comprise water, alkanes having 3 to 7 carbon atoms, cycloalkanes having 4 to 7 carbon atoms or mixtures of at least two of said compounds.

6. A process of using aminoalkyl- or aminophenylimidazoles of the formula

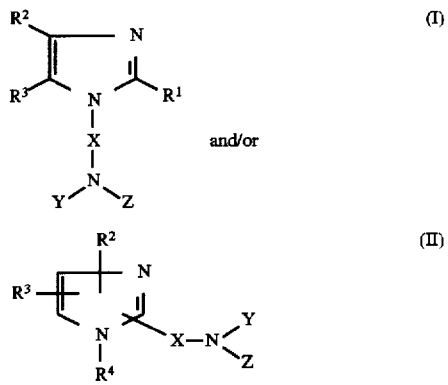

where R[1], R[2], R[3], R[4], X, Y and Z are as defined in claim 1, as catalysts for the preparation of polyisocyanate polyaddition products.

7. The process of claim 6, comprising 1-(3-aminopropyl) imidazole, 1-(3-aminopropyl)-2-methylimidazole or 1-(3-aminopropyl)-2-ethyl-4-methylimidazole as a catalyst in the preparation of polyisocyanate polyaddition products.

8. The process of claim 2, wherein the organic and/or modified organic polyisocyanates (a) comprise NCO-containing prepolymers having an NCO content of from 30 to 9 percent by weight, based on polyether- or polyester-polyols and one or more diphenylmethane diisocyanate isomers, modified organic polyisocyanates containing urethane groups and having an NCO content of from 33.6 to 15 percent by weight based on 4,4'-diphenylmethane diisocyanate or diphenylmethane diisocyanate isomer mixtures, mixtures of 2,4- and 2,6-tolylene diisocyanates, mixtures of tolylene diisocyanates and crude MDI or mixtures of the above prepolymers based on diphenylmethane diisocyanate isomers and crude MDI.

9. The process of claim 8, wherein the polyhydroxyl compounds comprise polyether-polyols or polyester-polyols having a functionality in the range of 2.0 to 4.0 and a molecular weight of 500 to 8,500.

10. The process of claim 9, wherein the blowing agents (d) comprise water, alkanes having 3 to 7 carbon atoms, cycloalkanes having 4 to 7 carbon atoms or mixtures of at least two of said compounds.

11. The process of claim 2, wherein the blowing agents (d) comprise water, alkanes having 3 to 7 carbon atoms, cycloalkanes having 4 to 7 carbon atoms or mixtures of at least two of said compounds.

12. The process of claim 2, wherein the polyhydroxyl compounds comprise polyether-polyols or polyester-polyols having a functionality in the range of 2.0 to 4.0 and a molecular weight of 500 to 8,500.

* * * * *